June 30, 1931. J. H. HUNT 1,812,437
WHEEL DISK
Filed April 2, 1926 2 Sheets-Sheet 2

INVENTOR.
J. Harold Hunt,
BY
John P. Tarbox
ATTORNEY.

Patented June 30, 1931

1,812,437

UNITED STATES PATENT OFFICE

J HAROLD HUNT, OF DETROIT, MICHIGAN, ASSIGNOR TO BUDD WHEEL COMPANY, OF DETROIT, MICHIGAN, A CORPORATION OF PENNSYLVANIA

WHEEL DISK

Application filed April 2, 1926. Serial No. 99,192.

The invention relates to a disk wheel for motor vehicles and, more particularly, to the disk wheel body supporting the rim from the hub.

It is an object of the invention to provide a wheel disk of this class which is extremely light in weight, and resilient, yet at the same time strong and durable and capable of standing up under the severe road shocks to which such wheels are subjected.

Other and further objects and advantages will become apparent from the following description taken in connection with the accompanying drawings in which.

Figure 1:
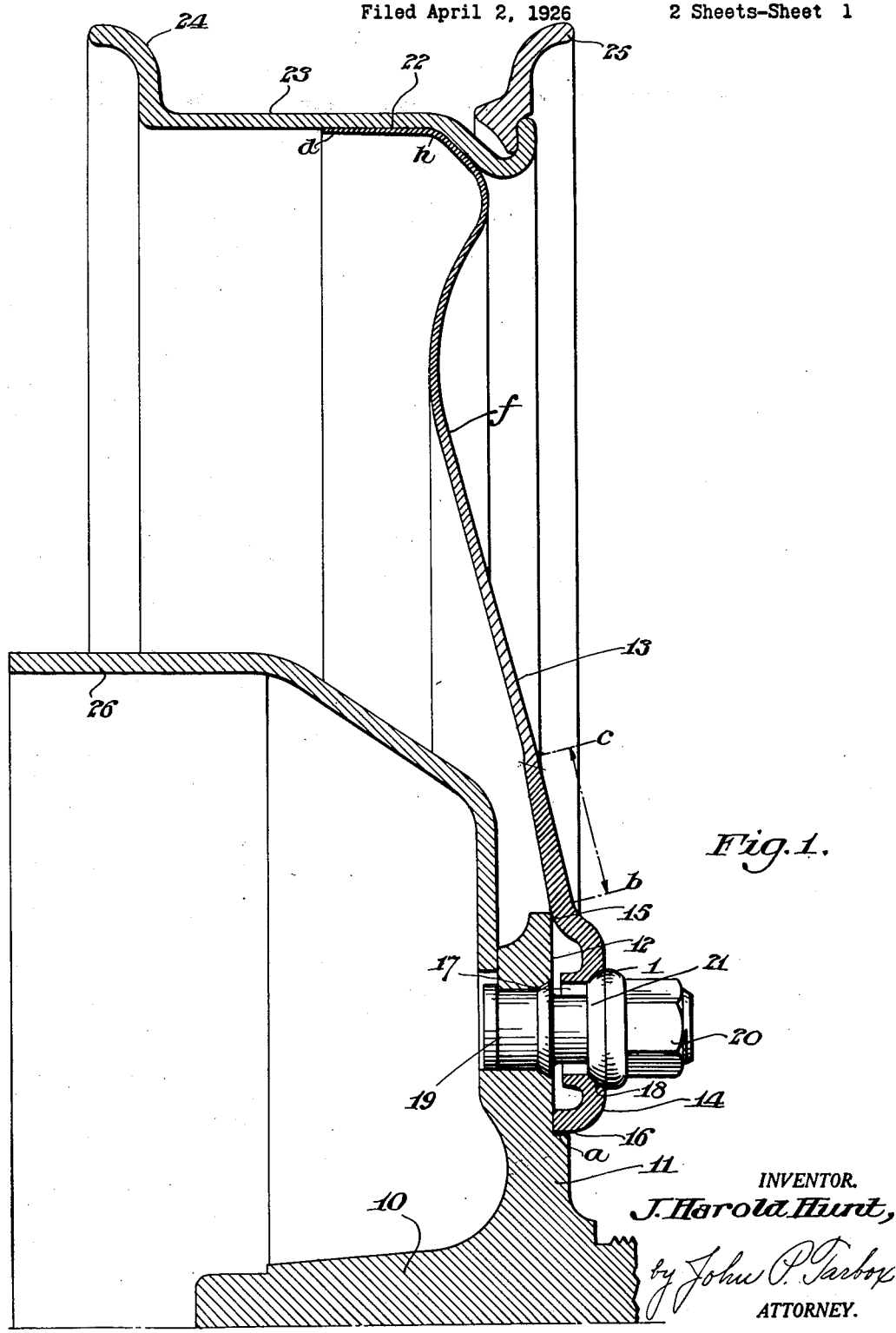
Fig. 1 is a partial section of a wheel embodying the invention, the section being taken through the wheel axis.
Figure 4:
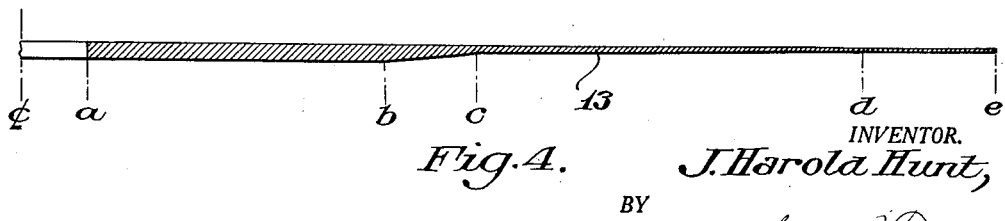

The disk shown in Fig. 1 has the extreme peripheral portion flanged over to form a rim seat and is tapered, whereas the modification shown in Fig. 4 shows the peripheral portion forming the rim seat, of uniform thickness.

In the drawings, the invention is shown applied to a disk wheel of the type that is demountable at the hub. The hub 10 is provided with a radial flange 11 providing a seat 12 against which the disc body 13 of the wheel is clamped.

The disk wheel body 13 has a central opening and is provided around this central opening with an annular rib 14. The annular rib 14 provides spaced portions engaging the seat on the hub in zones 15 and 16 located, respectively, adjacent the outer and inner edges of said rib. Between these spaced zones the annular rib is provided with an annular series of coined holes 17 (only one of which is shown) which are formed with concave seats 18. To secure the wheel disk body to the hub, studs 19 are suitably mounted in the radial flange 11 of the hub, said studs being equal in number to the coined holes 17 of the disk body, and having their outer screw-threaded ends projecting through said holes when the disk wheel body is applied to the hub. Cap nuts 20 each having a convex seat 21 complemental to the concave seats 18 in the disk wheel body cooperate with the studs 19 to removably secure the disk wheel body to the hub.

At its outer portion the disk wheel body is preferably flanged over, as at 22, to form a seat adapted to receive a tire carrying rim 23 of any desired form. In the drawings a rim adapted for straight side tires and having one fixed flange 24 and one removable flange 25 is shown. The rim 23 may be secured in any desired manner (not shown) as by welding or riveting or otherwise to the flange 22 of the disk body. Obviously, if desired, a felly member adapted to receive a demountable rim might be substituted for the rim 23 shown in the drawings, and the wheel disk, instead of being demountable at the hub, might be fixedly secured thereto.

To the rear face of the hub flange 11 may be secured the usual brake drum 26 by any convenient securing means (not shown).

The construction so far described is well known, and has been inserted here merely as a setting for the real invention now to be described. The invention resides primarily in the cross sectional shape and in the contour of the disk wheel body and in the combination of these features, whereby I am enabled to obtain a light and resilient metal disk wheel without sacrifice of strength and durability.

More specifically, it consists in forming the portion or zone of the disk surrounding the central opening therein between the approximate limits indicated by the points $a$ and $b$, Figs. 1 and 4, of metal of relatively heavy gage and of uniform cross section. Beyond the zone $a-b$ is a zone indicated by the limits $b-c$ this zone having a rapidly tapering cross section to a third zone. The third zone forms the greater portion of the body of the wheel and extends between the limits $c-d$. The metal in this zone is of light gage relatively and substantially uniform taper. This portion may, as shown in Fig. 1, extend from point c to the periphery of the disk, including the turned over flange 22, or it may terminate approximately where the body of the disk meets the rim, the remaining portion or zone as indicated by the limits d—e, in the modified disk body shown in Figs. 3 and 4, being again of a uniform cross section but of very light gage.

Figure 2:
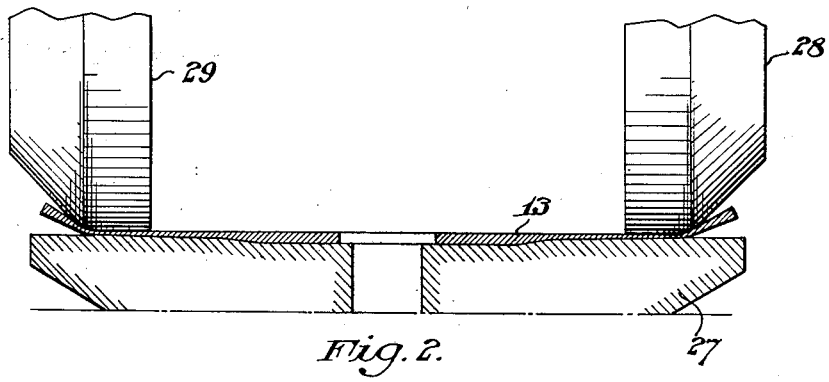
Fig. 2 shows a method of forming the improved wheel disk by a rolling operation.
Figure 3:
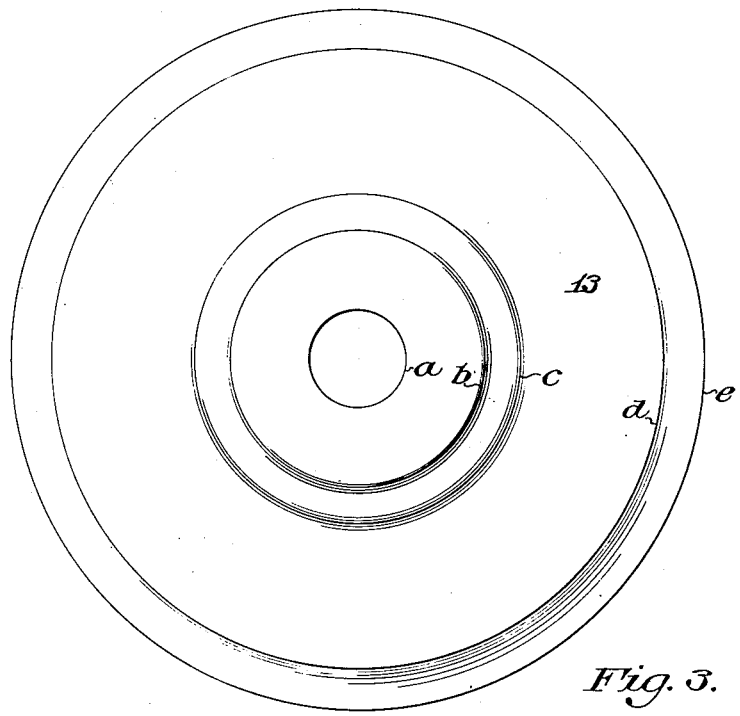
Figs. 3 and 4 show respectively an underside and partial transverse section of a modification of a disk embodying the invention as it appears after the rolling operation shown in Fig. 2 but before the forming operation to which it is subjected to produce the finished contour shown in Fig. 1.

A disk body of this cross section can be readily formed by a rolling operation as disclosed in Fig. 2, in which the blank to be rolled in place upon a rotating table 27 having a surface contour corresponding to the cross sectional form which it is desired to give the disk, and then a narrow faced roll or a pair of narrow faced rolls 28 and 29 are brought by relative approaching movement of the rolls and table into rolling contact with the blank adjacent the center, after which they are traversed outwardly in a direction at right angles to the axis of the platen to roll and expand the disk. In Fig. 2 the table is given a surface contour to produce, after the rolling operation just described, a disk having the configuration shown in Figs. 3 and 4. By suitably forming operations, such as die pressing, etc., the disk of Figs. 3 and 4 is converted into the finished product represented by Fig. 1.

While a wheel disk having the metal distribution hereinbefore described may be given various forms, the purposes of the invention are most fully realized by giving the disk substantially the form shown in Fig. 1.

In this figure, the wheel disk 13 is represented as being of a generally outwardly dished form, the inner portion being in the shape of an annular rib secured to the radial flange on the hub, as already described, and the portion of the disk extending outwardly from the hub seat providing a wide annular zone including substantially all of the zone of rapid taper b—c and the inner portion of the zone c—d of slight taper and relatively light gage. This annular zone is itself dished outwardly to some extent independently of the general dished form of the disk and is represented in the drawings as extending approximately two-thirds of the distance from the hub to the rim between the limits b—f. The position of the outer limit of this annular zone may vary rather widely from a position outwardly removed from c a distance substantially equal to the distance b—c, to a position somewhat closer to the rim than that shown, and, preferably, between this outer limit f and the rim the disk is given the form of an ogee curve in cross-section, the two reversely curved portions of which have relatively large radii, as shown, the ogee curve, making up substantially the remaining portion of the disk body extending between the hub and rim and terminating in the lateral rim seating flange 22.

The form of wheel disk described permits the advantageous use of lighter gage metal for the greater part of the wheel disk body than has heretofore been considered practical, while retaining great strength and also providing a wheel affording an adequate measure of resilience. The contour of the disk also gives the wheel a pleasing external appearance. The relatively thick portion of the disk extending from b to c is important because it gives a stronger wheel toward the center where the point of greatest stress occurs. If an abrupt shoulder were provided at the point b, a heavier grade of metal would be required throughout the disk in order to resist radial shocks. By providing varying degrees of taper, I am thus enabled to effect an economy of material at the same time that I strengthen the wheel.

The annular zone b—f dished outwardly at its central portion strengthens the disk in this zone against radial shocks and, at the same time, allows lateral flexing of the wheel disk in the region c where the portion of rapid taper merges into the portion of slight taper to take up shocks due to forces acting laterally against the rim of the wheel, without producing a permanent set in the disk and without placing undue strain upon the disk in the region b adjacent its seats on the hub flange.

While I have herein shown and described a specific embodiment of my invention which I have found to work satisfactorily in practice, I am aware that changes may be made therein without departing from the spirit of the invention, and I mean to include such changes within the scope of the following claim.

What I claim and desire to secure by Letters Patent is:

A vehicle wheel comprising in combination, a hub having a radial flange formed thereon, a wheel body in the form of a metal disk having a relatively thick central portion adapted to abut said radial flange and be secured thereto, a zone of substantially uniform taper extending outwardly from the portion of said disk abutting said hub flange for a considerable part of the radial extent of said wheel, a second zone extending outwardly from said first named zone, said second zone being of a slighter taper relative to the taper of said first zone and extending substantially to the rim-engaging portion of the disk.

In testimony whereof he hereunto affixes his signature.

J HAROLD HUNT.